(12) United States Patent
Monden

(10) Patent No.: US 10,142,114 B2
(45) Date of Patent: Nov. 27, 2018

(54) ID SYSTEM AND PROGRAM, AND ID METHOD

(71) Applicant: Akira Monden, Tokyo (JP)

(72) Inventor: Akira Monden, Tokyo (JP)

(73) Assignee: NEC CORPORATION, Tokyo (JP)

( * ) Notice: Subject to any disclaimer, the term of this patent is extended or adjusted under 35 U.S.C. 154(b) by 200 days.

(21) Appl. No.: 14/808,301

(22) Filed: Jul. 24, 2015

(65) Prior Publication Data

US 2015/0333911 A1  Nov. 19, 2015

Related U.S. Application Data

(63) Continuation of application No. 12/279,629, filed as application No. PCT/JP2007/051453 on Jan. 30, 2007, now Pat. No. 9,112,705.

(30) Foreign Application Priority Data

Feb. 15, 2006 (JP) ................. 2006-038029

(51) Int. Cl.
*H04L 29/00* (2006.01)
*H04L 9/32* (2006.01)
(Continued)

(52) U.S. Cl.
CPC ............ *H04L 9/3271* (2013.01); *G06F 21/32* (2013.01); *H04L 9/3231* (2013.01);
(Continued)

(58) Field of Classification Search
CPC .................... G06F 21/00; H04L 9/32
(Continued)

(56) References Cited

U.S. PATENT DOCUMENTS 5,541,994 A 6/1996 Tomko et al.
6,167,517 A 12/2000 Gilchrist et al.
(Continued)

FOREIGN PATENT DOCUMENTS

CA 2 433 538 A1 8/2002
JP 09-185691 7/1997
(Continued)

OTHER PUBLICATIONS

Japanese Office Action dated Mar. 6, 2012 received in related JP 2008-500431.
(Continued)

*Primary Examiner* — Brandon S Hoffman
*Assistant Examiner* — Michael D Anderson
(74) *Attorney, Agent, or Firm* — Scully, Scott, Murphy & Presser, P.C.

(57) ABSTRACT

[PROBLEMS] To appropriately authenticate a user, a biometric device, and an authentication timing of a client side and prevent leak or tampering of the biometric information. [MEANS FOR SOLVING PROBLEMS] A server device includes: a unit for encrypting information for requesting biometric authentication and identifying the request by using a public key of the biometric authentication device and transmitting the information; and a unit for authenticating the user according to the authentication information containing the result of the biometric authentication. The biometric authentication device includes: a unit for inputting biometric information; a unit for storing a template as biometric information registered in advance together with the user information; a unit for collating the biometric information inputted by the user with the template; a unit for adding a digital signature to the authentication information containing the collation result, information for identifying the request from the server device, and the template user (Continued)

information, by using a secret key of the local device and transmitting the authentication information to the server device.

10 Claims, 15 Drawing Sheets

(51) Int. Cl.
*G06F 21/32* (2013.01)
*G06F 21/10* (2013.01)
*H04L 29/06* (2006.01)

(52) U.S. Cl.
CPC .......... *H04L 9/3247* (2013.01); *H04L 9/3268* (2013.01); *G06F 21/10* (2013.01); *H04L 63/0861* (2013.01)

(58) Field of Classification Search
USPC ........................................................ 713/169
See application file for complete search history.

(56) References Cited

U.S. PATENT DOCUMENTS

| | | | |
|---|---|---|---|
| 6,484,260 B1 | 11/2002 | Scott et al. | |
| 6,920,561 B1 | 7/2005 | Gould et al. | |
| 7,117,370 B2 | 10/2006 | Khan et al. | |
| 7,366,904 B2 | 4/2008 | Roh et al. | |
| 7,404,086 B2* | 7/2008 | Sands | G06F 21/32 713/186 |
| 7,519,558 B2 | 4/2009 | Ballard et al. | |
| 7,526,653 B1 | 4/2009 | Vogel et al. | |
| 7,529,930 B2 | 5/2009 | Morgan, III | |
| 7,587,368 B2 | 9/2009 | Felsher | |
| 7,613,929 B2 | 11/2009 | Cohen et al. | |
| 7,614,078 B1 | 11/2009 | Stieglitz | |
| 7,676,439 B2 | 3/2010 | Tattan et al. | |
| 8,316,237 B1 | 11/2012 | Felsher et al. | |
| 8,352,730 B2* | 1/2013 | Giobbi | G06F 21/32 713/155 |
| 8,539,249 B2* | 9/2013 | Wei | G06F 21/42 713/186 |
| 2001/0034836 A1 | 10/2001 | Matsumoto et al. | |
| 2002/0007453 A1 | 1/2002 | Nemovicher | |
| 2002/0104006 A1 | 8/2002 | Boate et al. | |
| 2002/0194131 A1 | 12/2002 | Dick | |
| 2003/0012382 A1 | 1/2003 | Ferchichi et al. | |
| 2003/0105966 A1 | 6/2003 | Pu et al. | |
| 2004/0059924 A1 | 3/2004 | Soto et al. | |
| 2004/0230809 A1 | 11/2004 | Lowensohn et al. | |
| 2005/0102520 A1 | 5/2005 | Baxter et al. | |
| 2005/0133582 A1 | 6/2005 | Bajikar | |
| 2006/0013393 A1 | 1/2006 | Ferchichi et al. | |
| 2006/0034494 A1 | 2/2006 | Holloran | |
| 2007/0016790 A1 | 1/2007 | Brundage et al. | |
| 2007/0106895 A1 | 5/2007 | Huang et al. | |
| 2007/0136792 A1 | 6/2007 | Ting et al. | |
| 2007/0186212 A1 | 8/2007 | Mazzaferri et al. | |
| 2007/0198656 A1 | 8/2007 | Mazzaferri et al. | |
| 2007/0226516 A1 | 9/2007 | Kubota et al. | |
| 2008/0149713 A1 | 6/2008 | Brundage | |
| 2008/0178002 A1 | 7/2008 | Hirata et al. | |
| 2009/0282260 A1 | 11/2009 | Tattan et al. | |

FOREIGN PATENT DOCUMENTS

| | | |
|---|---|---|
| JP | 2002-543668 | 12/2002 |
| JP | 2003-143136 | 5/2003 |
| JP | 2003-256376 | 9/2003 |
| JP | 2004-518229 | 6/2004 |
| JP | 2005-532736 A | 10/2005 |
| WO | 02/061550 A2 | 8/2002 |
| WO | 2004/006076 A2 | 1/2004 |

OTHER PUBLICATIONS

United States Official Action dated Jun. 23, 2011 received in related U.S. Appl. No. 12/279,629.
United States Official Action dated Feb. 1, 2012 received in related U.S. Appl. No. 12/279,629.
United States Official Action dated Mar. 19, 2013 received in related U.S. Appl. No. 12/279,629.
United States Official Action dated Sep. 10, 2014 received in related U.S. Appl. No. 12/279,629.
Notice of Allowance dated Apr. 2, 2015 received in related U.S. Appl. No. 12/279,629.

* cited by examiner

ID SYSTEM AND PROGRAM, AND ID METHOD

CROSS REFERENCE TO RELATED APPLICATION

The present application is a Continuation application of U.S. Ser. No. 12/279,629 filed Aug. 15, 2008, which is a '371 filing of PCT/JP2007/51453 filed on Jan. 30, 2007 and claims the benefit of priority from Japanese Patent Application No. 2006-038029, filed on Feb. 15, 2006, the entire disclosures of each of which are incorporated herein by reference.

TECHNICAL FIELD

The present invention relates to a technique for confirming IDs of users between computers that are connected to a network and, more specifically, to a technique using biometric information such as fingerprints for confirming the IDs.

BACKGROUND ART

As an encrypting technique, a method of confirming IDs by using public keys is well known. This method called "Public Key Infrastructure (PKI)" uses a pair of encrypting keys with which information encrypted on one side can be decrypted only on the other side. One of the keys is saved confidentially as a secret key of a user to an IC card or the like, and the other is opened as a public key.

Encrypted texts that can be decrypted with the public key of the user are the texts encrypted with the secret key of the user. Through checking whether or not an encrypted text such as an electronic signature can be decrypted with the open key of the user by utilizing such mechanism, it is possible to clarify whether or not the signature is encrypted with the secret key that makes a pair with the public key. However, with this method, it is difficult to check whether or not a person who has presented the encrypted text such as the signature is a legitimate user, since it is possible for other parties to obtain the secret key by stealing the IC card to which the secret key is recorded, or by lending or borrowing the IC card between the user and the others.

Normally, the secret key is protected by a password or the like so as to secure a link between the secret key and the user with the password. However, it is also possible to tell the password itself to the others. Further, the password can be analogized or stolen by fishing or the like. Therefore, it is difficult to guarantee the link between the secret key and the user by simply protecting the key with the password.

Recently, biometric authentication that confirms ID of a person by using biometric features such as a fingerprint, iris, face, or vein has become well known. This is a method which confirms the ID of the user by comparing a template that is biometric information recorded in advance and biometric information inputted by a subject user.

There is a method which uses this biometric authentication as the basis for authenticating the public key to protect the secret key through the biometric authentication. In a client server system, the biometric authentication is conducted on the client side. When the authentication is successful, the secret key can be made available. Thus, the signature encrypted with that secret key is sent to the server. The server performs individual authentication of the user by using the received signature. However, it is not known in this case whether or not the secret key is obtained through actually performing the biometric authentication, even though it is possible to recognize that the client has the secret key.

In view of the foregoing issues, Patent Document 1 depicts an example of a conventional ID system in which a server checks that the biometric authentication is conducted on a client side, and performs user authentication. In the ID system depicted in Patent Document 1, a biometric authentication device connected to the client gives a signature on a result of the biometric authentication. Then, the client gives a user signature on the signed collation result, and sends it to the server as collation related data.

Patent Document 1: Japanese Unexamined Patent Publication 2003-143136.

DISCLOSURE OF THE INVENTION

With the method depicted in Patent Document 1 described above, it is possible for the server to know at which device the authentication is conducted. Further, it is possible to check what kind of biometric authentication is performed with what extent of authentication accuracy, since the device used for the authentication can be clarified.

However, a first issue of the method in Patent Document 1 is that the biometric authentication device cannot guarantee the link between the presented signature and the user. As shown in FIG. 14 on the left side, in the collation related data depicted in Patent Document 1, the biometric authentication device gives a signature 2 for a collation result 1, and a user signature 3 is added thereon. Therefore, with the public key of the user, it is possible to extract the collation result 1 to which the signature 2 of the biometric authentication device is added, as shown in FIG. 14 on the right side. Normally, the public key is not kept confidentially, so that the signature of the device can be easily extracted from the collation related data.

Further, if the signature 2 of the biometric authentication device can be extracted, it is possible to create an authentication result of another user by adding a signature 3' of another user thereon, as shown in FIG. 15. Therefore, it is difficult to guarantee the link between the user signature and the user that has gone through the biometric authentication with the signature 2 of the biometric authentication device.

A second issue is that it is not possible with the method of Patent Document 1 for the server side to know when the biometric authentication is conducted. An example of inconveniences raised when the timing of the authentication cannot be specified is that the relation between the collation related data presented by the client and a target service cannot be guaranteed, when there are services that can be made available after going through the individual authentication. It is difficult to provide the service properly for the user unless the relation between the both is guaranteed.

A third issue of the method depicted in Patent Document 1 is that the template of the biometric information is inputted to the biometric authentication device by a secure medium that belongs to the individual user. In the cases of using a password or an encrypting key, if there is a possibility that the password or the encrypting key is known to a third party, the registered contents thereof can be changed so that the password or the encrypting key known to the third party can be made invalid. However, in the cases of using the biometric information, even if fingerprint data is let out, for example, it cannot be changed. That is, it is not possible to register different fingerprint with a same finger. Thus, it is desired for the template of the biometric information to be set immovable between the devices.

The present invention is designed in view of the foregoing issues. It is a first object of the present invention to provide a technique for enabling a server side to recognize the relation between a user of a biometric authentication device and authentication information presented by the device. Further, a second object of the present invention is to provide a technique for enabling the server side to recognize the relation between a service provided by the server and the authentication information. Furthermore, a third object of the present invention is to provide a technique for preventing leakage and tampering of individual biometric information.

An ID system according to the present invention includes a server device and a biometric authentication device which are connected to be able to communicated each other, wherein the server device includes: a unit which requests individual authentication based on biometric information to the biometric authentication device, encrypts information for identifying the request with a public key of the biometric authentication device, and transmits the encrypted information to the biometric authentication device; and a unit which makes authentication judgment on the user based on authentication information including a result of the individual authentication, and the biometric authentication device includes: an input device which inputs biometric information of the user; a storage device which stores user information along with a template that is biometric information registered in advance and a secret key corresponding to the public key; a unit which collates the template with the biometric information inputted in response to a request for individual authentication sent from the server device; and a unit which adds an electronic signature with the secret key on the authentication information that includes a result of the collation, the information for identifying the request from the server device, and the user information of the template, and transmits the authentication information to the server device.

The present invention makes it possible to prevent a third party from pretending to be a user by simply stealing the user information, since the biometric authentication device adds a signature on the user information including the result of biometric authentication. With this, the first object of the present invention can be achieved. Further, with the present invention, the authentication information informed from the biometric authentication device to the server device contains the information for identifying the authentication request. With this, the second object of the present invention can be achieved. Furthermore, with the present invention, the biometric authentication device stores the templates of the biometric information to the own storage device, and performs input and collation of the biometric information. Therefore, it is unnecessary to output the individual biometric information to the outside. With this, the third object of the present invention can be achieved.

With the present invention, a signature is added to the authentication information including the result of the biometric authentication by using a secret key that makes a pair with a public key of the biometric authentication device. Thus, it becomes difficult to succeed in receiving authentication of the server device with false authentication information. With this, the accuracy of individual authentication on the network using the biometric information can be increased.

BEST MODES FOR CARRYING OUT THE INVENTION

First Exemplary Embodiment a. FIG. 1 shows a system structure of a first exemplary embodiment of the present invention. A system 11 of this exemplary embodiment includes a biometric authentication device 100, a device authentication station 200, and a server 300. FIG. 13 shows a basic structure of hardware that is provided to the biometric authentication device 100.

The biometric authentication device 100 includes a CPU 100a, a storage device 100b such as a hard disk, a memory 100c such as a ROM and a RAM, a biometric information sensor 100d for inputting biometric information such as a fingerprint or an iris of a user, a display device 100e, and a communication device 100f for communicating with external computers.

As a specific mode for the biometric authentication device 100, it is possible to employ a mode that is connected to an information processing terminal such as a computer with USB and the like or a mode that is formed integrally with the information processing terminal. In the former case, the information processing terminal is interposed for communicating with the server 300. Further, for the latter case, components of the information processing terminal are used for the components of the above-described structure except for the biometric information sensor 100d, and the terminal itself is considered as the biometric authentication device 100.

As shown in FIG. 1, such biometric authentication device 100 is configured with an authentication request reception unit 101, a collation unit 102, a biometric information input unit 103, a template storage unit 104, and a signature unit 105.

The biometric information input unit 103 is a structural element that corresponds to the biometric information sensor 100d shown in FIG. 13. The template storage unit 104 is a structural element that corresponds to a storage area of the storage device 100b, which stores a template that is biometric information registered in advance along with user information such as an ID number.

When registering the template to the template storage unit 104, a relation between the biometric information to be registered and the user information of the subject user is to be guaranteed. For that, it is necessary to prevent user information of a person other than the actual subject user from being written to the template, through registering the template at a prescribed reliable registering organization, through employing an electronic signature of the user or a certificate as the user information, etc., for example.

The authentication request reception unit 101, the collation unit 102, and the signature unit 105 are functional structural element of the biometric authentication device 100, and those can be executed when the CPU 100a executes programs that is stored in the storage device 100b or the memory 100c.

The authentication request reception unit 101 receives a request for individual authentication with biometric information from the server 300. The collation device 102 collates the biometric information inputted from the biometric information input device 103 with the template that is registered in the template storage unit 104.

The signature unit 105 adds a signature to authentication information including the collation result obtained by the collation unit 102, the user information in the template, and identification information of the authentication request from the server 300 by using a secret key of the own device that is saved in the storage device 100b in advance, and transmits it to the server 300. The secret key of the biometric authentication device 100 is saved in advance in the storage device 100b or the like.

As the functional structure, the server 300 includes: an authentication request unit 301 for requesting individual authentication with biometric information to the biometric authentication device 100; and an authentication unit 302 for judging whether or not the user is to be authenticated based on authentication information (described later) which is presented by the biometric authentication device 100. The authentication request unit 301 and the authentication unit 302 can be executed when a CPU (not shown) of the server 300 executes programs stored in a storage device (not shown).

The biometric authentication device 100 has an anti-tampering characteristic, i.e., has such a mechanism that the program for defining its operations cannot be altered from outside. The device authentication station 200 guarantees that the biometric authentication device 100 has the anti-tampering characteristic and performs authentication with prescribed accuracy. Further, the server 300 obtains the encrypting key that corresponds to the secret key of the biometric authentication device from the device authentication station 200. As the encrypting key that corresponds to the secret key, it is possible to use a public key of a normal public-key code. In this exemplary embodiment, the encrypting key corresponding to the secret key is called a public key hereinafter. However, it is not essential to open the public key to the public. In this exemplary embodiment, it is described to check the anti-tampering characteristic of the biometric authentication device 100 and the public key of the biometric authentication device 100 by using the device authentication station 200. However, it is not necessary to use the device authentication station 200 under circumstances such as when those can be guaranteed by a company to which the biometric authentication device 100 is distributed, e.g., when the biometric authentication device 100 is applied to an in-house system of a specific company.

Overall operations of the exemplary embodiment will be described in details. First, operations of the sever 300 will be described by referring to a flowchart shown in FIG. 2. The server 300 issues, to the biometric authentication device 100, an authentication request including a value that can specify the authentication request of this time (step A1). It is possible to increase the security by encrypting the authentication request with the public key of the biometric authentication device 100 so that the request cannot be read by others than the biometric authentication device 100.

Thereafter, the server 300 receives authentication information including the result of individual authentication by the biometric information from the biometric authentication device 100 (step A2). Then, the server 300 judges the legitimacy of the target user by verifying whether or not the received authentication information is for the authentication request issued earlier, and whether or not the result of the individual authentication is obtained by the proper biometric authentication device 100 by using the public key of the biometric authentication device 100 (step A3).

Operations of the biometric authentication device 100 will be described by referring to a flowchart shown in FIG. 3. When the authentication request is issued from the server 300, the authentication request receiving unit 101 receives it and decrypts it with the secret key of the own device (step B1). The biometric information input device 103 reads a fingerprint or the like from the user, and inputs the biometric information (step B2).

The collation device 102 collates the inputted biometric information with the template that is recorded in the template storage unit 104 (step B3). The signature unit 105 applies a signature with the secret key of the biometric authentication device 100 on the authentication information that contains the result of collation, the user information of the template, and the identification information of the authentication request from the server 300 (step B4). Then, the collation unit 102 transmits the authentication information with the signature to the server 300 (step B5).

With the first exemplary embodiment, the signature is added to authentication information including the biometric authentication result by using the secret key that makes a pair with the public key of the biometric authentication device 100 that is guaranteed by the device authentication station 200. This makes it difficult to succeed in receiving authentication from the server 300 with illegitimate authentication information. Thereby, it becomes possible to increase the accuracy of individual authentication using the biometric information.

Further, it is possible to prevent an illegitimate user from pretending to be the legitimate user of the biometric authentication device 100, since the biometric authentication device 100 gives the signature on the result of the biometric authentication. Therefore, the authentication information itself cannot be falsified even if the user information alone can be tampered, and it is essential for the user to be recognized as the legitimate user oneself by biometric authentication for succeeding in falsification.

Further, it is possible for the server 300 that has issued the authentication request to know the relation between the request and the authentication information from the biometric authentication device 100. It is because the server 300 issues the information for identifying the authentication request and the information is written to the authentication information that is sent from the biometric authentication device 100 to the server 300.

Furthermore, it is possible to prevent leakage and tampering of the biometric information of the user. It is because the template is saved within the biometric authentication device 100, and input and collation of the biometric information are also conducted by biometric authentication device 100.

Second Exemplary Embodiment b. FIG. 4 shows a system structure of a second exemplary embodiment of the present invention. Referring to FIG. 4, a system 12 of this exemplary embodiment is equivalent to a structure that is obtained by adding a device verification unit 106 to the above-described biometric authentication device 100 shown in FIG. 1 and adding a verification unit 303 to the server 300. These are both functional structures of the biometric authentication device 100 and the server 300.

The device verification unit 106 functions to generate verification information (described later) for verifying that the own device is properly operating, and to transmit the verification information to the server 300. Thus, it is considered that the device that essentially requires the anti-tampering characteristic in the biometric authentication device 100 of this exemplary embodiment is only the device verification unit 106. For giving the anti-tampering characteristic to the device verification unit 106, a measure for preventing the program from being tampered may simply be taken. In order to do so, it is desirable to save the program of the device verification unit 106 in a read-only storage medium (not rewritable) such as a ROM, for example, separately from other programs.

The verification unit 303 of the server 300 judges whether or not the device is properly operating based on the verification information from the biometric authentication device 100.

The operations of the exemplary embodiment will be described. First, the operation of the biometric authentication device 100 will be described by referring to a flowchart show in FIG. 5. Upon receiving an authentication request from the server 300 (step B1), the biometric authentication device 100 generates verification information by the device verification unit 106 (step D1), and transmits it to the server 300 (step D2). Steps B2-B5 thereafter are the same as those shown in FIG. 3, so that explanations thereof will be omitted.

There is no specific limit set for the verification information as long as it is possible with that information to judge whether or not the operation of the biometric authentication device 100 is executed properly. For example, hash values of the programs saved in the storage device 100b and the memory 100c or data amount and checksums of the program may be used.

Next, the operation of the server 300 will be described by referring to a flowchart of FIG. 6. The server 300 issues the above-described authentication request to the biometric authentication device 100 (step A1), and receives verification information regarding the operation from the biometric authentication device 100 thereafter (step C1).

The verification unit 303 verifies whether or not each unit of the biometric authentication device 100 is operating properly based on the received verification information (step C2). For the verification, appropriateness of the verification information such as the hash values is checked by communicating with the device authentication station 200 so as to judge whether or not the operation of the biometric authentication device 100 is properly executed.

In the second exemplary embodiment described above, the biometric authentication device 100 is provided with the device verification unit 106 and the server 300 is provided with the verification unit 303. Thus, it is possible to increase the accuracy of individual authentication regarding that user further. Furthermore, with this exemplary embodiment, it becomes unnecessary to provide the anti-tampering characteristic to the structural elements of the biometric authentication device 100 other than the device verification unit 106. For that, the cost can be reduced.

Third Exemplary Embodiment c. FIG. 7 shows a system structure of a third exemplary embodiment of the invention. Referring to FIG. 7, a system 13 of this exemplary embodiment is equivalent to a structure that is obtained by adding a user selection unit 107 to the above-described biometric authentication device 100 shown in FIG. 1, and storing templates of a plurality of users in the template storage unit 104. The user selection unit 107 is a functional structure element of the biometric authentication device 100.

The user selection unit 107 reads out the templates of the plurality of users saved in the template storage unit 104 in order and supplies those to the collation unit 102, and specifies the corresponding user based on the collation result. Further, the user selection unit 107 supplies user information that is contained in the template of the specified user to the signature unit 105.

The operations of the exemplary embodiment will be described. The operation of the server 300 of this exemplary embodiment is the same as the one shown in FIG. 2, so that explanations thereof will be omitted. FIG. 8 shows processing order of the biometric authentication device 100. When the biometric authentication device 100 receives the authentication request from the server 300 by the biometric information reception unit 101 (step B1), the biometric information input device 103 inputs the biometric information (step B2).

Subsequently, the user selection unit 107 reads out the templates of the plurality of users in order from the template storage unit 104 and supplies those to the collation unit 102, and the collation unit 102 collates the supplied templates with the biometric information from the biometric information input device 103 in order (Steps E1, B3, E2).

The user selection unit 107 specifies the template that corresponds to the biometric information inputted this time, at a point where the collation of all the templates is completed or at a point where the template that satisfies a prescribed collation criterion is detected (step E4). Then, the user selection unit 107 extracts the user information that is contained in that template, and supplies it to the signature unit 105.

Hereinafter, processing for transmitting the authentication information with the signature from the signature unit 105 to the server 300 (steps E4, E5) is the same as the corresponding procedure shown in FIG. 3.

In the third exemplary embodiment described above, the user selection unit 107 is provided to the biometric authentication device 100. Thus, it is possible to share a single biometric information device 100 with a plurality of users. This is preferable for a case where a single information processor having the biometric authentication device 100 is shared by a plurality of users for business operations, for example.

Examples d. Next, Example of the above-described first exemplary embodiment will be presented. Example described herein is presented by assuming a scene where, as shown in FIG. 9, a client 400 such as a personal computer requests a browsing service of a members-only Web page to a service server 410 such as a Web server that is connected to a network 420. The client 400 is a computer containing the biometric authentication device 100 of the above-described exemplary embodiment, and the service server 410 and an authentication server 430 are computers corresponding to the server 300 and the device authentication station 200.

Further, as a more specific system structure, there is considered a structure shown in FIG. 10, for example. That is, it is a structure where a personal computer 500 connected to the biometric authentication device 100 makes an access to a Web server 510 via a LAN 520 with a Web browser 510. In this structure, the Web server 510 is connected to be communicable with the device authentication station 200 via an external network 530.

In addition to the personal computer 500, any information processing terminals such as a PDA and a mobile telephone can be used as the client 400. Further, the client 400 shown in the drawing is structured by having the biometric authentication device 100 attached externally to the personal computer 500. However, the both may be structured integrally. That is, on the appearance, a readout sensor of the biometric authentication device 100 may be extruded from a part of the personal computer 500.

The services provided by the server 410 may be any services such as electronic shopping server, a ticketing server, and the like, for example. The network 420 to which the client 400 and the service server 410 are connected may be any networks such as the Internet, a network connected via a dedicated line, and the like, other than the LAN 520.

Operations executed by the system structure shown in FIG. 10 will be described by referring to a sequence shown in FIG. 11. The personal computer 500 connected to the LAN 520 is connected to a Web browser 500A by an operation of the user to transmit a request for browsing a members-only page (F1). Upon receiving the browsing request for the members-only page, the Web server 510 sends an authentication request by biometric information to the personal computer 500 (F2).

Upon receiving the authentication request, the personal computer 500 informs authentication form and authentication accuracy as well as signature form that can be handled with the biometric authentication device 100 to the Web server 510 by the Web browser 500A (F3, F4).

Note here that the authentication form and the accuracy indicate fingerprint authentication whose rate of accepting others (authentication accuracy) is $1/10{,}000{,}000$, face authentication whose rate of accepting others is $1/10{,}000$, or the like. Further, the signature form indicates MD5-RSA that uses MD5 as a hash function and uses RSA for a public key encrypting method, SHA1-RSA that uses SHA1 as the hash function and uses RSA for the public key encrypting method, or the like. The Web browser 500A informs the authentication form, the accuracy, and the signature form, given to the biometric authentication device 100, to the Web server 510.

Upon receiving the notification, the Web server 510 selects the authentication form, the accuracy, and the signature form which satisfy the request of own device from the notification, and informs the selected ones to the personal computer 500 (F5).

An example regarding the selections mentioned above will be described. It is assumed that the information notified this time from the personal computer 500 indicates the fingerprint authentication whose authentication accuracy is $1/10{,}000{,}000$, face authentication whose authentication accuracy is $1/10{,}000$, the MD5-RSA, and the SHA1-RSA. In the meantime, it is assumed that the authentication accuracy that the Web server 510 requires is $1/100{,}000$ or less, and the signature that can be verified by the Web server 510 are in the form of SHA1-RSA and SHA1-DSA. As the authentication form and the signature form satisfying such conditions, the Web server 510 selects the fingerprint authentication whose rate of accepting others (authentication accuracy) is $1/10{,}000{,}000$ and the SHA1-RSA from the contents notified from the personal computer 500. Then, the Web server 510 informs the selected contents to the personal computer 500.

When the authentication form and the authentication accuracy of the biometric authentication device 100 do not satisfy the request of the Web server 510 or when there is no signature form that is in common to the biometric authentication device 100, for example, the Web server 510 informs the Web browser 500 that the members-only page cannot be provided, and ends the session.

When the personal computer 500 receives the notification regarding the authentication form and the like from the Web server 510, the Web browser 500A requests the public key of the device to the biometric authentication device 100 (F6). When the biometric authentication device 100 supplies the own public key saved in the storage device 100b or the like to the Web browser 500A, the information of the public key is sent to the Web server 510 (F7). When the Web server 510 knows the public key of the biometric authentication device 100 in advance, the procedures above (F6, F7) are omitted.

The Web server 510 issues challenge data with random numbers as information for identifying the communication session that requested the biometric authentication, i.e., as information for identifying at what point the request for the biometric authentication of this time is made (F8).

The challenge data is random-number data used for challenge response authentication that is conventionally known as an authentication technique. By using the random numbers as the challenge data, the values thereof become different by each of the authentication requests. Thus, it is possible to specify at what point the authentication request is made by the use of the challenge data. As the identification information of the authentication request, information other than the challenge data, such as the authentication method of the target, the authentication accuracy, or the time at which the authentication is requested, may be used in combination with the challenge data.

The Web server 510 encrypts the generated challenge data with the public key of the biometric authentication device 100 (F9), and transmits the encrypted challenge data to the personal computer 500 (F10). As described, since the challenge data is encrypted with the public key of the biometric authentication device 100, decryption of the challenge data can be achieved only with the secret key of the same biometric authentication device 100.

Upon receiving the encrypted challenge data from the Web server 510, the biometric authentication device 100 decrypts the challenge data by using the own secret key (F11). The Web browser 500A encourages the user to input the biometric information through the biometric authentication device 100. As described above, the Web server 510 requests the fingerprint authentication in this case, so that the user place a finger on the biometric information input unit 103 (fingerprint sensor) of the biometric authentication device 100 to input the fingerprint.

The biometric information input unit 103 of this exemplary embodiment is a fingerprint sensor that is formed integrally with the biometric authentication device 100. By having the fingerprint sensor formed integrally with the device, it is possible to prevent an unlawful action such as inputting a false fingerprint image without touching the sensor. The fingerprint sensor as the biometric information input unit 103 may be attached externally to the device. In that case, it is desirable to specify the relation between the device main body and the fingerprint sensor by a device certificate (described later) for guaranteeing the authentication accuracy, considering a possibility that the authentication accuracy may vary depending on the fingerprint sensor to be attached externally.

The biometric authentication device 100 performs biometric authentication by collating the inputted fingerprint data with the template that is registered in advance (F12), and obtains the user information from the template that corresponds to the inputted fingerprint data (F13). Then, a signature formed with the secret key of the biometric authentication device 100 in the SHA1-RSA form that is the designated signature form is added on the authentication information that contains the user information, the challenge data that is decrypted earlier, and the result of the authentication performed this time (F14).

Subsequently, the biometric authentication device 100 supplies the authentication information with the signature to the Web browser 500A. The Web browser 500A transmits it to the server 300 as response data of the challenge response authentication (F15).

Upon receiving the response data, the Web server 510 decrypts it with the public key of the biometric authentication device 100, and verifies whether or not to give authentication to the user by using the device authentication station 200. Specifically, first, the signature of the received response data is decrypted by using the public key that is written on the device certificate that is issued by the device authentication station 200 regarding the biometric authentication device 100.

Further, the hash value of the authentication information of the remaining part of the response data, i.e., plaintext, is obtained by the hash function SHA1. When the hash value and the data of the signature that is decrypted earlier correspond to each other, it is proved that the biometric authentication device that has applied the signature is the one written on the device certificate, i.e., proved that the signature is applied by the legitimate biometric authentication device. It is because the encrypted text that can be decrypted with the public key of the biometric authentication device (100) is limited to the encrypted text that is encrypted with the secret key of the biometric authentication device (100).

Further, with the user information and the authentication result contained in the authentication information whose signature legitimacy has been proved, the legitimacy of the user is proved, i.e., it is proved that the user has been successfully authenticated by the legitimate biometric authentication device 100. Furthermore, it is possible to specify the authentication request for which the authentication information is returned, based on the challenge data contained in the authentication information.

A signature of the reliable device authentication station 200 is applied to the device certificate of the biometric authentication device 100. The Web server 510 may save this device certificate in advance or may request the biometric authentication device 100 for every authentication (F16) to obtain the certificate from the biometric authentication device 100 (F17).

Further, for the Web server 510 to check the device certificate of the biometric authentication device 100, the Web server 510 may keep an originally defined one instead of making an access to the device authentication station 200 every time. For example, "X. 509" certificate, which is a generally used public key certificate, may be used. Information that is not normally defined in the "X. 509" certificate is defined in an extension area.

When the authentication for the user this time succeeds as a result of the authentication judgment based on the above-described response data, the Web server 510 gives a permission to the personal computer 500 to browse the members-only page (F18).

Note here that the biometric authentication device 100 is designed to collate the inputted fingerprint data with the template with the accuracy that is requested by the Web server 510. This operation can be prevented from being illegitimately altered by preventing the template and the collation program of the collation unit 102 from being tampered. Further, tampering of the signature program can be made impossible by preventing tampering of the secret key used for the signature. Therefore, it is possible to prevent the illegitimate alteration in the above-described operation.

The device authentication station 200 checks whether or not the biometric authentication device 100 is designed in the above-described manner, and issues a device certificate with a signature of itself only when it can be guaranteed. As the device authentication station 200, it may be so structured that a registration station and an authentication station are operated separately, as in the case of the normal public key certificate.

As described above, the signature from the biometric authentication device 100 contains the challenge data that is issued by the Web server 510 when requesting the authentication. Thus, it is proved that the authentication result with the signature is not a reuse of the authentication result that is used in the past but the authentication result for the authentication request made this time. Therefore, when the signature of the client is confirmed as legitimate, it is possible to prove that the requested biometric authentication has been securely conducted at requested timing with requested authentication accuracy. Further, when the collation result indicates a success, the user is proved to be the legitimate user.

The fingerprint data inputted to the biometric authentication device 100 and the template are not to be taken out from the biometric authentication device 100. Therefore, in a case where the computer of the client is shared by other users or in a case where a plurality of computers are to be used even though those are used exclusively by an individual user, connection of the biometric authentication device 100 is changed every time the computer to be used is changed. Therefore, it is more convenient to employ radio communication than wire connection such as USB, regarding the connection form between the biometric authentication device 100 and the personal computer 500.

In Example described above, the biometric authentication device 100 informs the authentication methods and the authentication accuracies which can be dealt with the device itself to the Web server 510, and the Web server 510 selects the authentication method and the authentication accuracy therefrom. However, it may be in an inverted manner. That is, the Web server 510 may inform the requiring authentication accuracies and the like to the biometric authentication device 100, and the biometric authentication device 100 may make selections therefrom.

Further, as the user information written in the authentication information, it is not limited only to be ID information that can specify the user. An individual certificate may be used for that as well. Details of a method for utilizing the individual certificate is the same as that of a typical individual certificate for specifying an individual, so that explanations thereof will be omitted. Further, when the information such as ID that can specify the owner of the biometric authentication device 100 is written to the device certificate, it becomes possible to specify the owner while proving the legitimacy of the biometric authentication device 100 at the same time.

In Example described above, not a password but a fingerprint (biometric information) is used for authenticating the user. Therefore, it is possible to prevent the password from being stolen by a fishing fraud. Further, the fingerprint information is not to be outputted from the biometric authentication device 100, so that the fingerprint information can be prevented from being stolen.

Furthermore, Example above is described by referring to the case where the Web server 510 checks whether or not the user using the Web browser 500A is a legitimate user. It is possible to add a process for the Web browser 500A to check whether or not the connected Web server 510 is a legitimate server at the same time. By adding this process, a risk of having a fake server can be prevented.

Next, Example of the second exemplary embodiment will be described. As described by referring to FIG. 4, the biometric authentication device 100 according to the second exemplary embodiment has the device verification unit 106. Therefore, it is not essential for the medium for storing the program such as the storage device 100b other than the device verification unit 106 to have the anti-tampering characteristic.

Operations of this Example will be described by referring to a sequence shown in FIG. 12. In the sequence of the drawing, the operations from the point where the personal computer 500 transmits a request for browsing a members-only page to the Web server 510 (F1) to the point where the authentication information is transmitted (F15) are the same as the operations in the above-described Example shown in FIG. 11. Thus, explanations thereof will be omitted.

After sending a signature, the biometric authentication device 100 finds hash values of the programs of the device itself by the device verification unit 106, and informs those to the Web server 510 as the verification information (H1). The correct hash values of the programs in each unit of the biometric authentication device 100 are written to the device certificate that is issued by the device authentication station 200 regarding the biometric authentication device 100.

The Web server 510 verifies whether or not the transmitted verification information (hash values of the programs) shows the same values that are written on the device certificate of the biometric authentication device 100 (H2). When those are found to be the same as a result of the verification, it is judged that the biometric authentication device 100 is operating properly.

Upon recognizing that the operation of the biometric authentication device 100 is executed properly based on the verification and that the signature of the above-described response data is a proper signature, the Web server 510 gives a permission to the personal computer 500 for browsing the members-only page (F18). Further, when the hash values in the verification information are not proper values, it is judged that the authentication of this time is a failure even if the signature of the response data is a legitimate signature, and it is so informed to the personal computer 500.

Example of the third exemplary embodiment is almost the same as Example of the first exemplary embodiment shown in FIG. 11, except for the operation of the user selection unit 107 in the biometric authentication device 100. Therefore, explanation thereof will be omitted.

INDUSTRIAL APPLICABILITY e. While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

f. This applications is based upon and claims the benefit of priority from Japanese patent applications No. 2006-038029, filed on Feb. 15, 2006, the disclosure of which is incorporated herein in its entirety by reference.

The present invention can be applied to various kinds of usages which require ID confirmation through a network, such as so-called E-commerce (electronic commercial transactions) and net banking.

Figure 1:
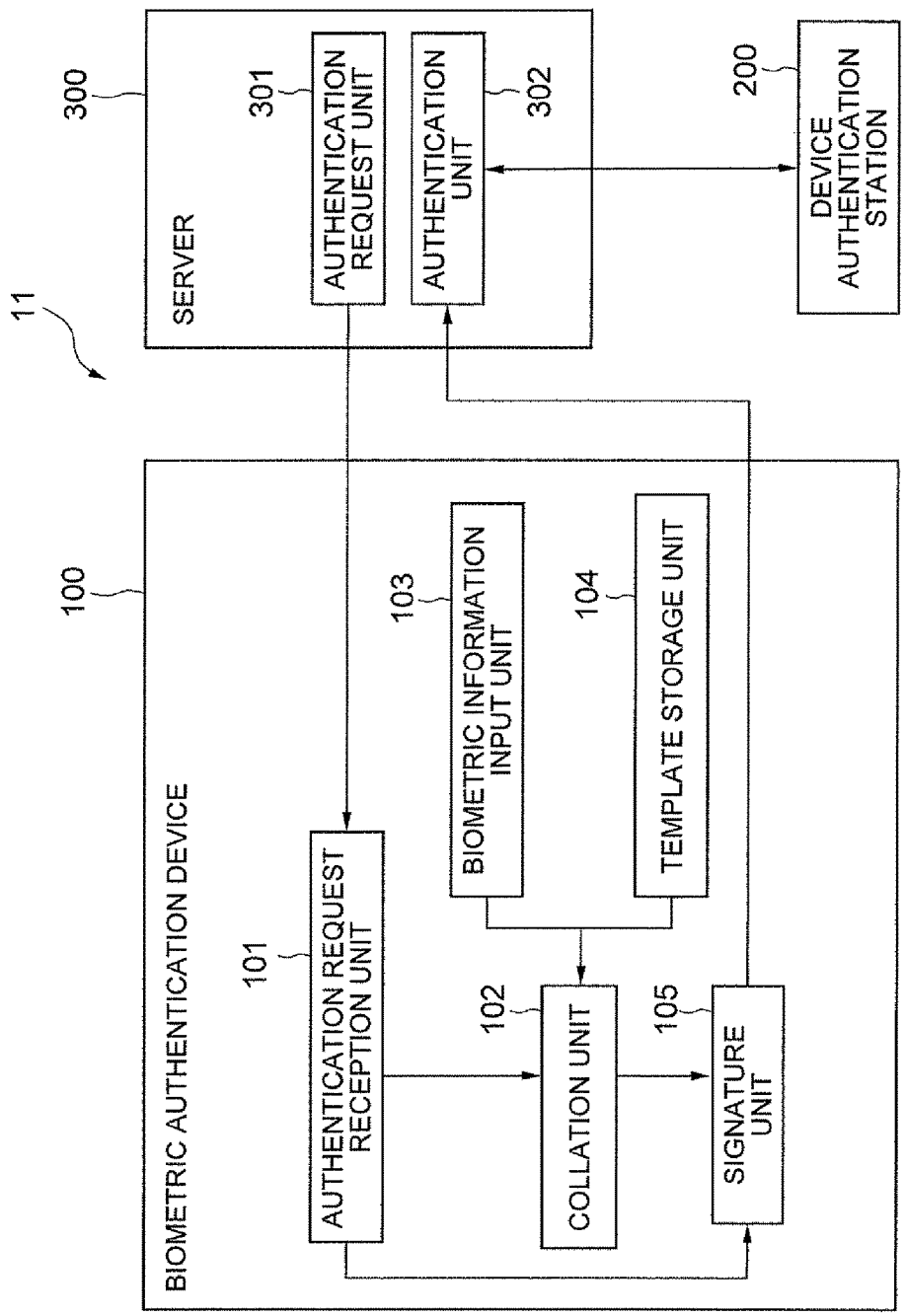
FIG. 1 is a block diagram showing a structure of a first exemplary embodiment of the invention.
Figure 2:
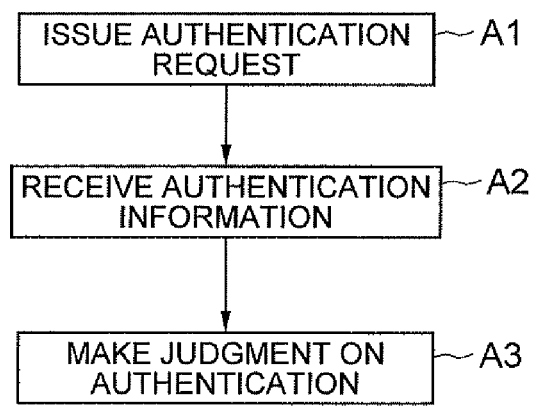
FIG. 2 is a flowchart showing operations of a server according to the first exemplary embodiment.
Figure 3:
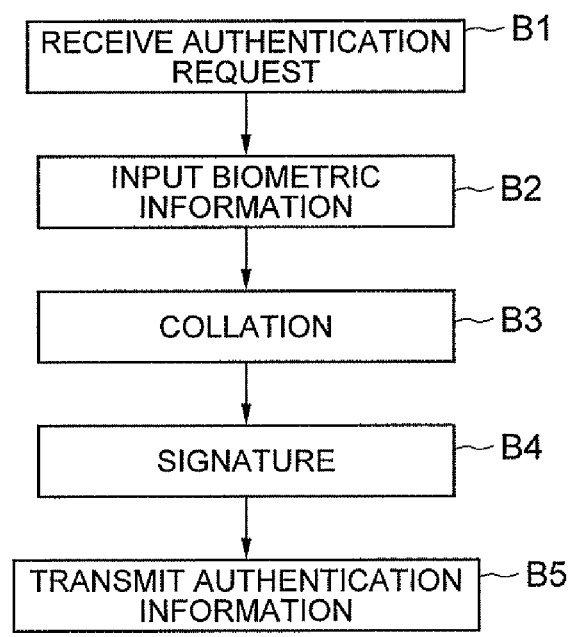
FIG. 3 a flowchart showing operations of a biometric authentication device according to the first exemplary embodiment.
Figure 4:
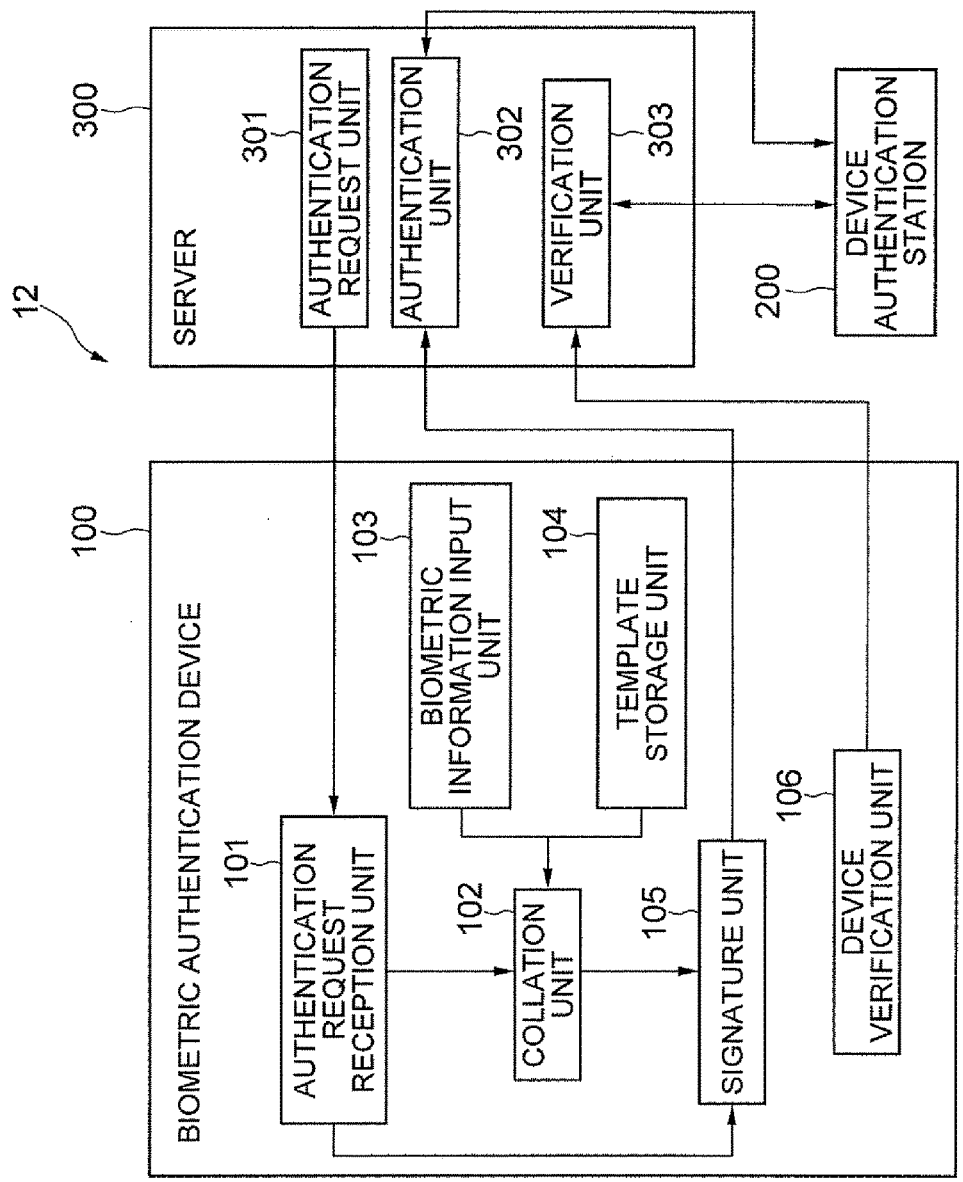
FIG. 4 is a block diagram showing a structure of a second exemplary embodiment of the invention.
Figure 5:
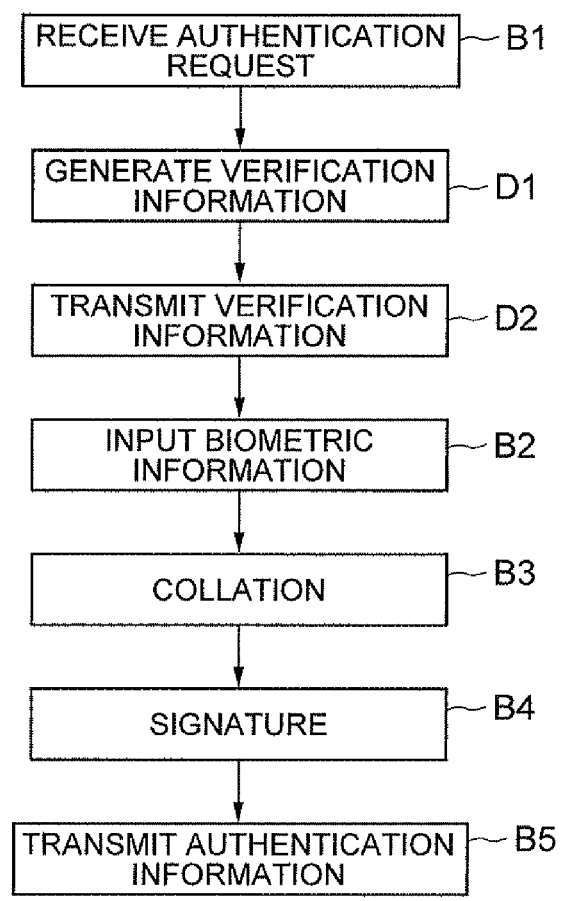
FIG. 5 is a flowchart showing operations of a biometric authentication device according to the second exemplary embodiment.
Figure 6:
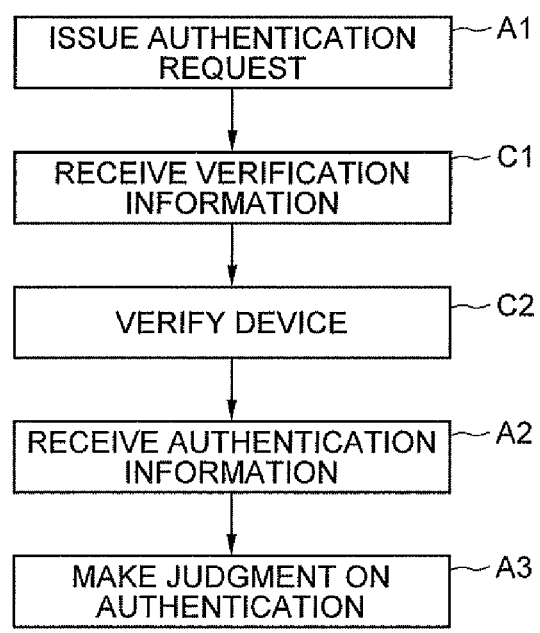
FIG. 6 is a flowchart showing operations of a server according to the second exemplary embodiment.
Figure 7:
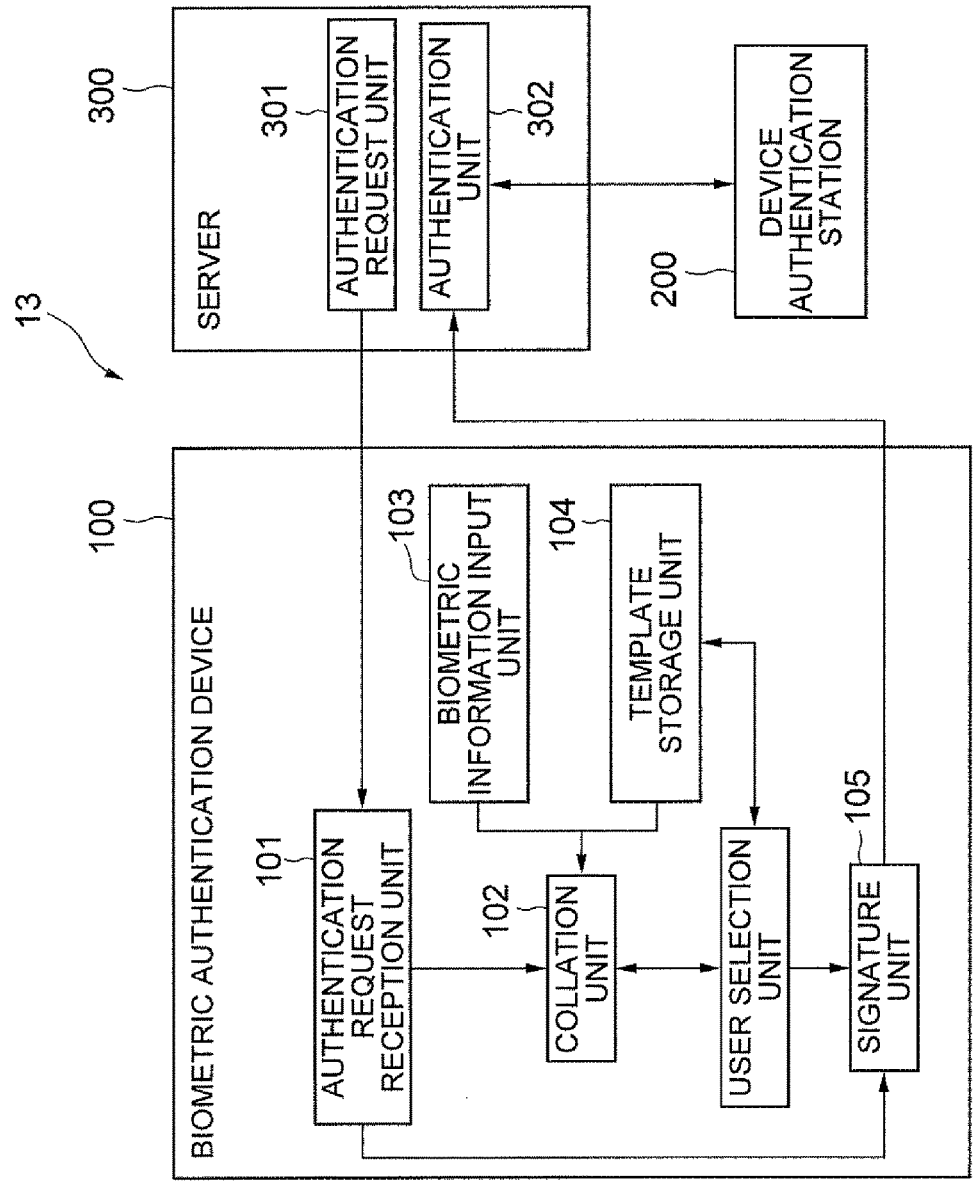
FIG. 7 is a block diagram showing a structure of a third exemplary embodiment of the invention.
Figure 8:
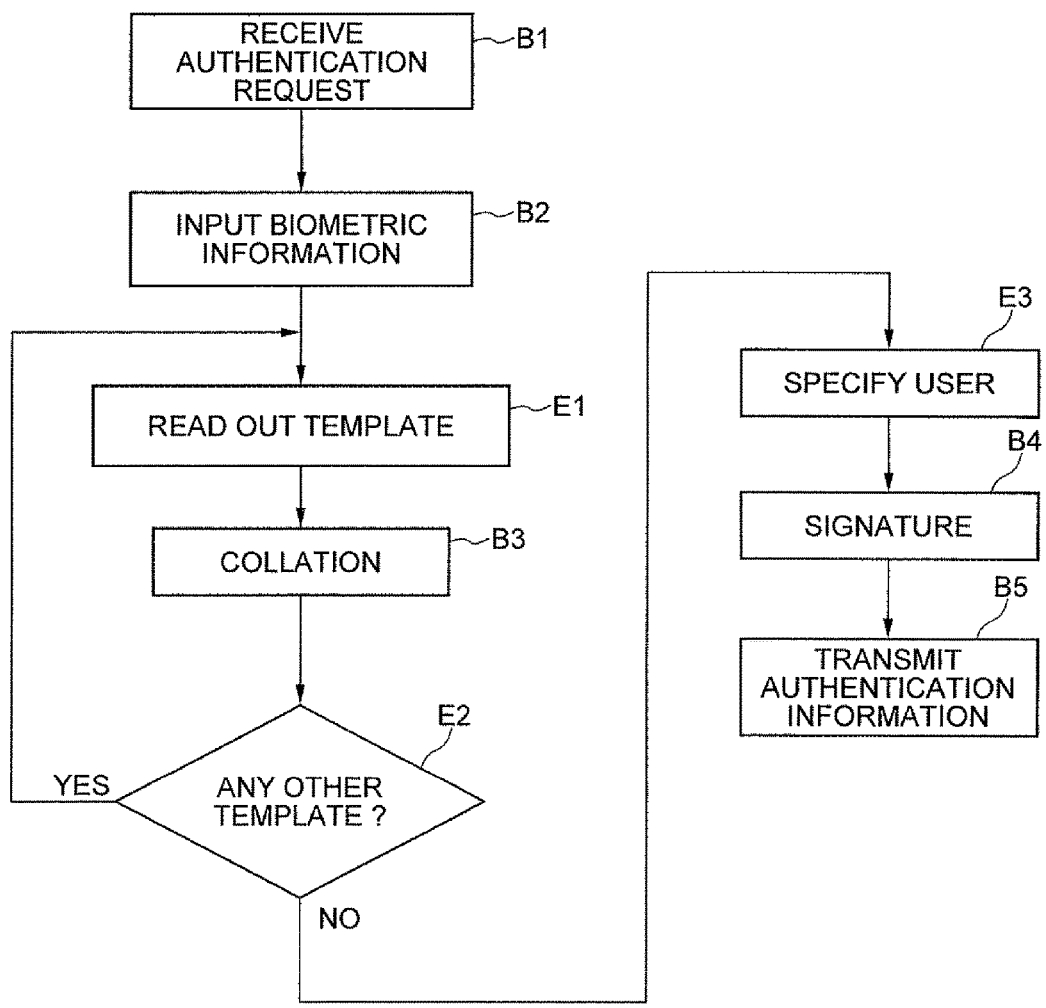
FIG. 8 a flowchart showing operations of a biometric authentication device according to the third exemplary embodiment.
Figure 9:
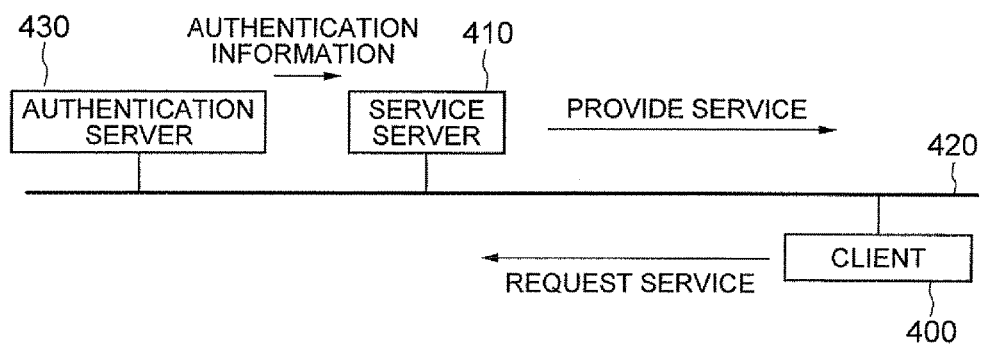
FIG. 9 is a block diagram showing a system structure in Example of the exemplary embodiment of the invention.
Figure 10:
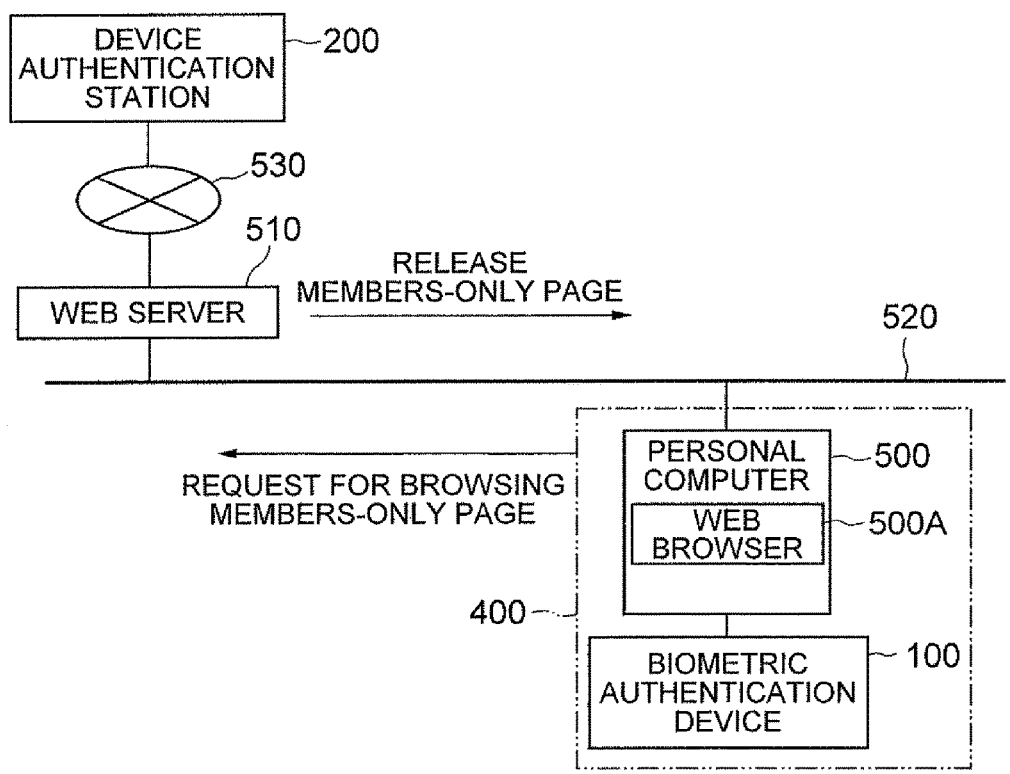
FIG. 10 is a block diagram showing a system structure in Example of the exemplary embodiment of the invention.
Figure 11:
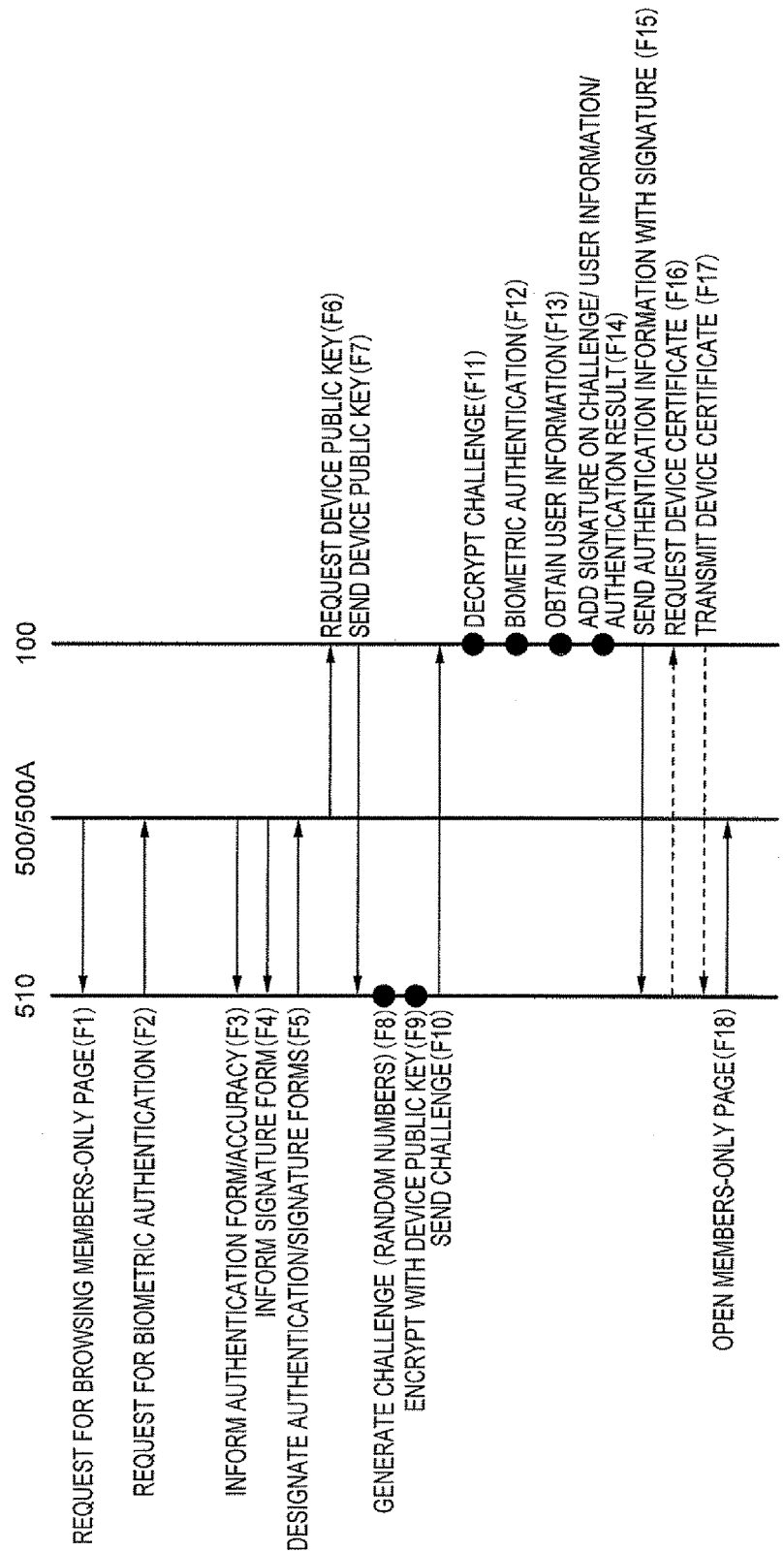
FIG. 11 is a sequence chart showing a processing order of Examples of the first and third exemplary embodiments.
Figure 12:
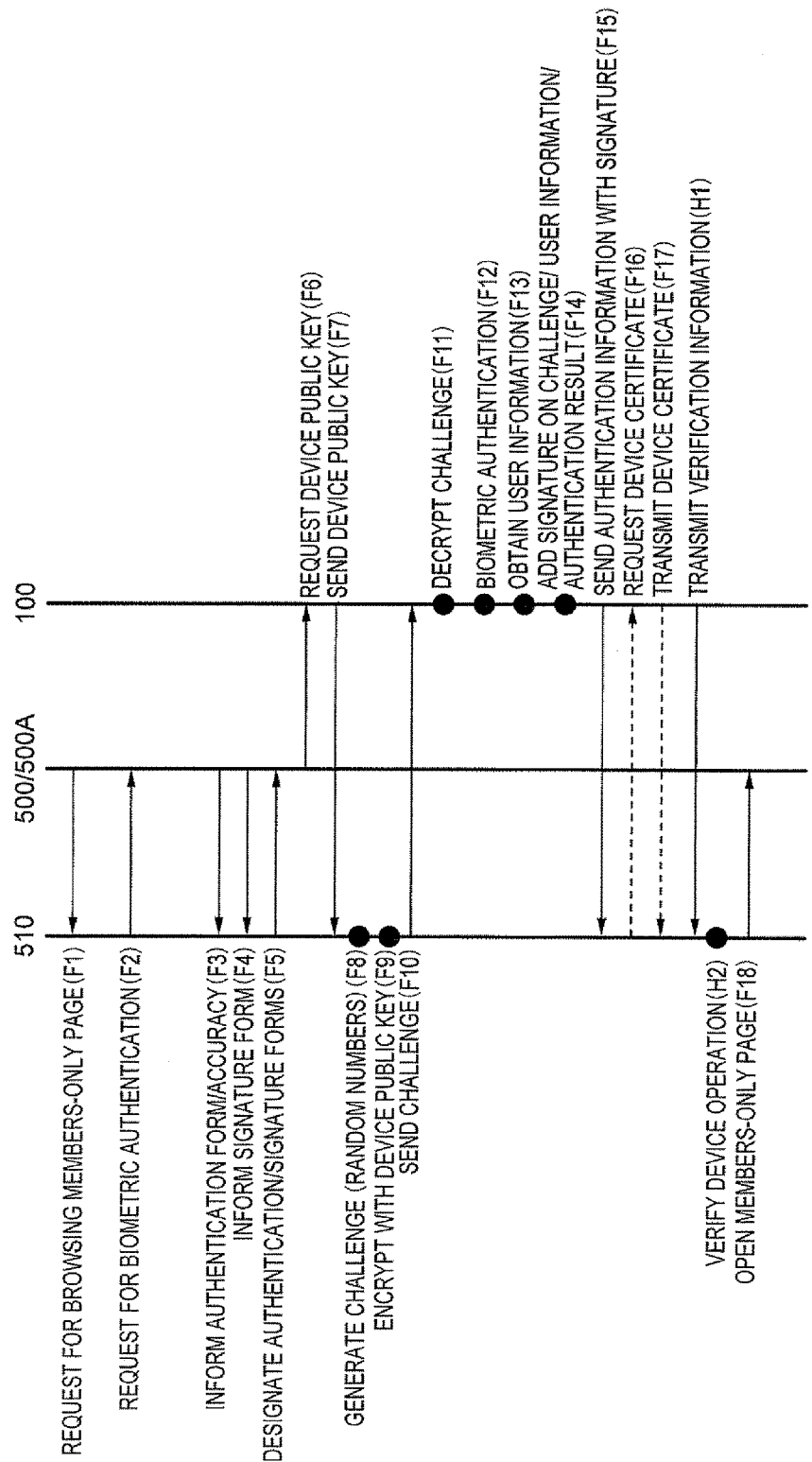
FIG. 12 is a sequence chart showing a processing order of Example of the second exemplary embodiment.
Figure 13:
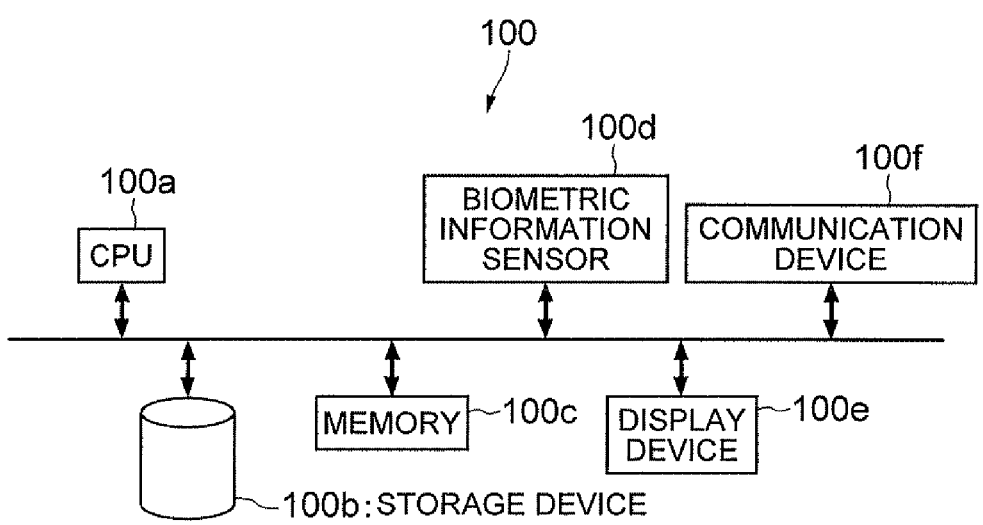
FIG. 13 is a block diagram showing a hardware structure of the biometric authentication device of the exemplary embodiment.
Figure 14:
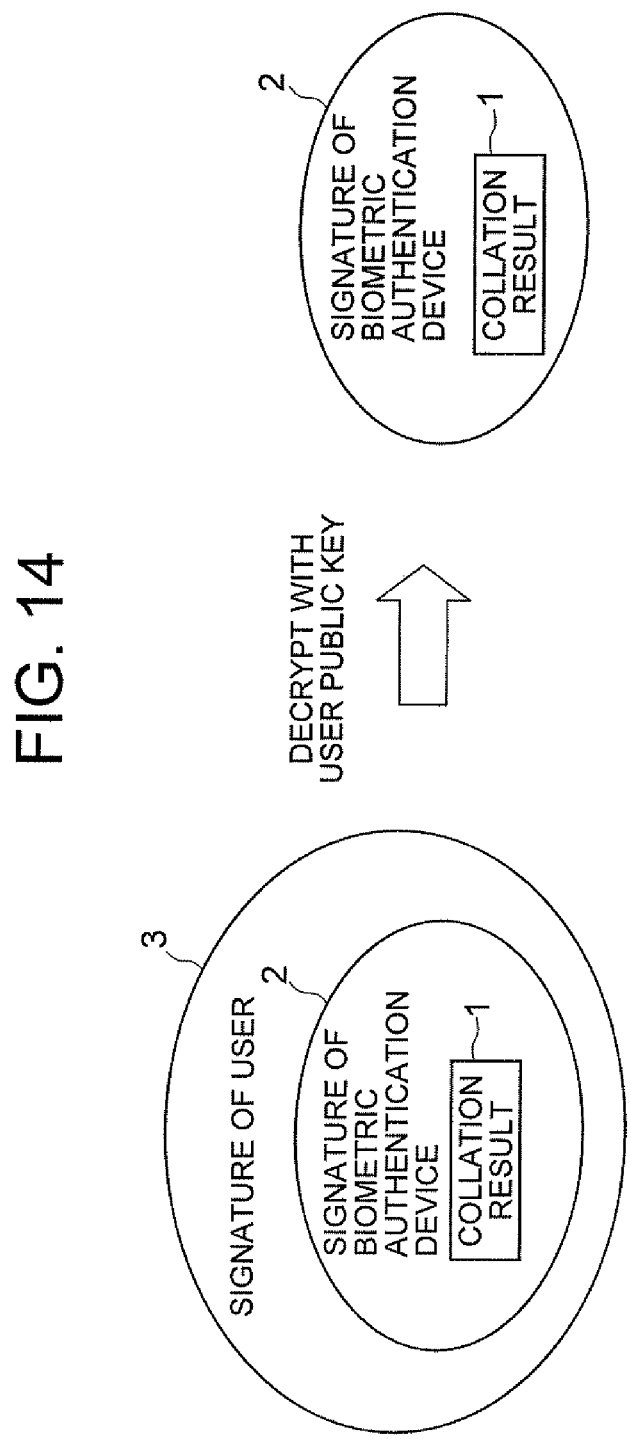
FIG. 14 is an explanatory illustration regarding a signature in a conventional ID system.
Figure 15:
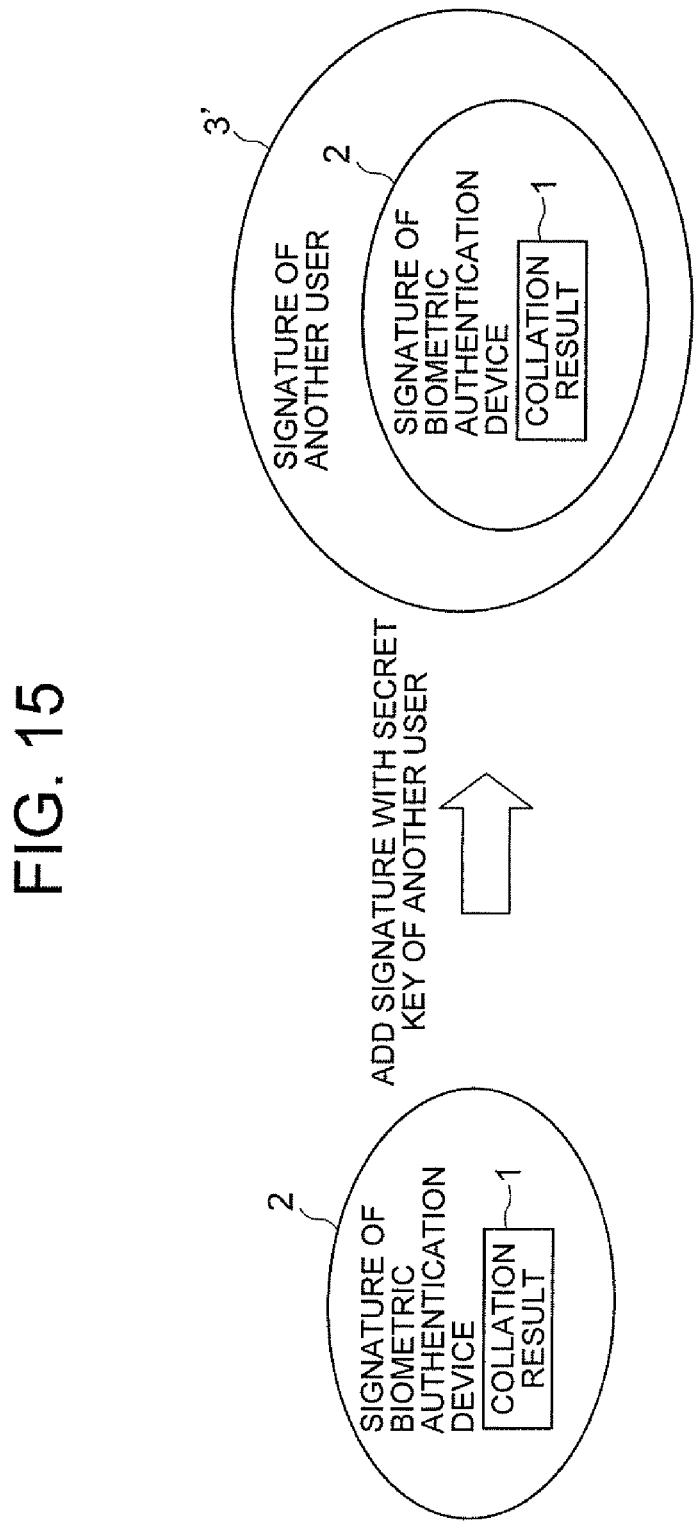
FIG. 15 is an explanatory illustration regarding a signature in a conventional ID system.

REFERENCE NUMERALS 11, 12, 13 System
100 Biometric authentication device
101: Authentication request reception unit, 102: Collation unit, 103: Biometric information input unit, 104: Template storage unit, 105: Signature unit, 106: Device verification unit, 107: User selection unit
200 Device authentication station
300 Server
301: Authentication request unit, 302: Authentication unit, 303: Verification unit
400 Client
410 Service server
420 Network
430 Authentication server
500 Personal computer
500A Web browser
510 Web server
520 LAN
530 External network

The invention claimed is:

1. An ID system comprising a server device, a biometric authentication device, and a device authentication unit, wherein:
the device authentication unit issues a device certificate for guaranteeing an authentication operation of the biometric authentication device including its authentication accuracy;
the server device transmits a biometric authentication request including information that can identify the request to the biometric authentication device;
the biometric authentication device transmits the information that can identify the request, a user information and a biometric authentication result to the server by adding a signature that is formed with a secret key that is peculiar to the biometric authentication device; and the server device verifies the signature of the transmitted data by using an encrypting key that corresponds to the secret key peculiar to the biometric authentication device so as to check the result of biometric authentication that is conducted at the biometric authentication device by corresponding to the request under a guarantee of the biometric authentication device, and check the biometric authentication result under a guarantee of the device authentication unit based on the biometric authentication result that is checked under the guarantee of the biometric authentication device and the device certificate issued from the device authentication unit so as to confirm that it is the biometric authentication result corresponding to the request.

2. The ID system as claimed in claim 1, wherein the server device comprises: a unit which requests individual authentication based on biometric information to the biometric authentication device, encrypts information for identifying the request with a public key of the biometric authentication device, and transmits the encrypted information to the biometric authentication device; and a unit which makes authentication judgment on a user based on authentication information including a result of the individual authentication, and the biometric authentication device comprises: an input device which inputs biometric information of the user; a storage device which stores user information along with a template that is biometric information registered in advance and the secret key corresponding to the public key; a unit which collates the template with the biometric information inputted in response to a request for individual authentication sent from the server device; and a unit which adds an electronic signature with the secret key on the authentication information that includes a result of the collation, the information for identifying the request from the server device, and the user information of the template, and transmits the authentication information to the server device.

3. The ID system as claimed in claim 2, wherein:

the biometric authentication device comprises a unit which finds hash values of programs of the device itself as the verification information, and transmits the verification information for verifying appropriateness of operations of the device itself to the server device; and the server device comprises a unit which verifies the appropriateness of the operations of the biometric authentication device based on the verification information from the biometric authentication device.

4. The ID system as claimed in claim 2, wherein:

the biometric authentication device comprises a unit which reads out each template of a plurality of users in order for the collation from the storage device, and applies the user information of the template that corresponds to the biometric information inputted from the input device to the authentication information.

5. The ID system as claimed in claim 2, wherein the server device generates random numbers as the information for identifying the request for performing individual authentication sent to the biometric authentication device.

6. An ID method for performing authentication by exchanging information between a server device and a biometric authentication device, the method comprising:

issuing a device certificate for guaranteeing an authentication operation of the biometric authentication device including its authentication accuracy from the device authentication unit;

transmitting a request for biometric authentication including information that can identify the request to the biometric authentication device from the server device;

transmitting the information that can identify the request, a user information and a biometric authentication result to the server by the biometric authentication device by giving a signature thereon with a secret key that is peculiar to the biometric authentication device; and verifying the signature of the transmitted data by the server device with using an encrypting key that corresponds to the secret key peculiar to the biometric authentication device, so as to check the result of biometric authentication that is conducted at the biometric authentication device by corresponding to the request under a guarantee of the biometric authentication device, and checking the biometric authentication result under a guarantee of the device authentication unit based on the biometric authentication result that is checked under the guarantee of the biometric authentication device and the device certificate issued from the device authentication unit so as to confirm that it is the biometric authentication result corresponding to the request.

7. The ID method as claimed in claim 6, comprising:

requesting individual authentication based on biometric information to a biometric authentication device that is connected to be communicable with a device itself, encrypting information for identifying the request with a public key of the biometric authentication device, and transmitting the encrypted information to the biometric authentication device;

making authentication judgment on a user based on authentication information including a result of the individual authentication, and inputting biometric information of the user;

storing user information along with a template that is biometric information registered in advance and the secret key corresponding to the public key;

collating the biometric information inputted to the device itself in response to a request for individual authentication sent from the server device with a template that is biometric information stored to a storage device of the device itself along with user information;

adding an electronic signature on authentication information that includes a result of the collation, the information for identifying the request from the server device, and the user information of the template with a secret key that is stored in advance in the storage device of the device itself, and transmitting the authentication information to the server device; and performing authentication judgment on the user based on the authentication information.

8. A biometric authentication device for an ID system that includes a server and the biometric authentication device, comprising:

a hardware processer; and a memory storing instructions, wherein the hardware processor is configured by the instructions to:

receive an authentication request including request identification information that can identify the authentication request from the server, read a template data related to a first biometric information, and a template information, receive a second biometric information from a biometric information input device, collate the second biometric information with the template data, apply a signature with an authentication information including a secret key corresponding to a key which the server stores on the request identification information, the template information making a pair with the template data, and a result of collation between the second biometric information and the template data, and transmit the signed authentication information to the server.

9. The biometric authentication device according to claim 8, wherein the hardware processor is configured by the further instructions to:

transmit a device certification of the biometric authentication device to the server.

10. The biometric authentication device according to claim 8, wherein the template information includes an electronic signature of the user or a certificate as the user information.

* * * * *